United States Patent
Kaplan et al.

(10) Patent No.: US 9,569,606 B2
(45) Date of Patent: Feb. 14, 2017

(54) VERIFICATION OF A PATTERN BASED PASSCODE

(71) Applicant: International Business Machines Corporation, Armonk, NY (US)

(72) Inventors: Philippe Kaplan, Le Rouret (FR); Georges-Henri Moll, Villeneuve-Loubet (FR); Xavier Nodet, Antibes (FR); Olivier Oudot, Vallauris (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/732,957

(22) Filed: Jun. 8, 2015

(65) Prior Publication Data

US 2016/0357952 A1 Dec. 8, 2016

(51) Int. Cl.
*G06F 21/36* (2013.01)
*H04L 9/00* (2006.01)
*G06F 21/46* (2013.01)
*G06F 21/31* (2013.01)
*H04L 29/06* (2006.01)
(Continued)

(52) U.S. Cl.
CPC ............ *G06F 21/36* (2013.01); *G06F 21/31* (2013.01); *G06F 21/316* (2013.01); *G06F 21/46* (2013.01); *H04L 9/00* (2013.01); *H04L 9/32* (2013.01); *H04L 63/083* (2013.01); *H04W 12/06* (2013.01)

(58) Field of Classification Search
CPC .......... G06F 21/31; G06F 21/36; G06F 21/46; G06F 21/316; H04L 63/083; H04L 9/00; H04L 9/32; H04W 12/06
See application file for complete search history.

(56) References Cited

U.S. PATENT DOCUMENTS 6,151,593 A 11/2000 Cho et al.
7,562,227 B1* 7/2009 Cox ................ G06F 21/36
713/183

(Continued)

FOREIGN PATENT DOCUMENTS

EP 2597590 5/2013
EP 2674890 12/2013

OTHER PUBLICATIONS

Seto, Jamie, Ye Wang, and Xiaodong Lin. "User-habit-oriented authentication model: toward secure, user-friendly authentication for mobile devices." IEEE Transactions on Emerging Topics in Computing 3.1 (2015): 107-118.*

(Continued)

*Primary Examiner* — Kari Schmidt
(74) *Attorney, Agent, or Firm* — Schmeiser, Olsen & Watts, LLP; Michael A. Petrocelli

(57) ABSTRACT

A method and system for verification of a pattern based passcode. A user input of a series of key inputs is received. A registered pattern for the user of a sequence of keyboard direction movements is retrieved. A first character input in the series of key inputs is identified. It is determined that the identified first character is not in an excluded group of characters, wherein the excluded group of characters are previously used first characters in a defined period or number of instances for the user. In response to having determined that the first character is not in the excluded group of characters, the series of key inputs after the first character input is compared with the registered pattern for the user.

12 Claims, 8 Drawing Sheets

(51) Int. Cl.
*H04W 12/06* (2009.01)
*H04L 9/32* (2006.01)

(56) References Cited

U.S. PATENT DOCUMENTS

| | | | |
|---|---|---|---|
| 7,992,005 B2 | 8/2011 | Torres et al. | |
| 8,209,746 B2 | 6/2012 | Tamai et al. | |
| 8,752,147 B2 | 6/2014 | Tamai et al. | |
| 9,030,416 B2* | 5/2015 | Sharan | G06F 3/0237 345/168 |
| 9,117,068 B1* | 8/2015 | Zhang | G06F 21/36 |
| 2006/0059539 A1* | 3/2006 | Shashikumar | H04L 63/083 726/1 |
| 2007/0234063 A1 | 10/2007 | Ueda et al. | |
| 2008/0141362 A1* | 6/2008 | Torres | G06F 21/36 726/18 |
| 2008/0235788 A1* | 9/2008 | El Saddik | G06F 21/36 726/18 |
| 2009/0133120 A1* | 5/2009 | Cannizzaro | G06F 21/46 726/18 |
| 2009/0150677 A1* | 6/2009 | Vedula | G06F 21/46 713/183 |
| 2009/0165121 A1* | 6/2009 | Kumar | G06F 21/316 726/19 |
| 2010/0322485 A1* | 12/2010 | Riddiford | G06F 3/04842 382/115 |
| 2013/0276099 A1* | 10/2013 | Hoareau | G06F 21/36 726/18 |
| 2013/0340072 A1* | 12/2013 | Chu | G06F 21/36 726/18 |
| 2014/0366127 A1* | 12/2014 | DeLuca | G06F 21/36 726/19 |
| 2015/0281215 A1* | 10/2015 | Zia | H04L 63/083 726/7 |

OTHER PUBLICATIONS

Yue, Qinggang, et al. "Blind recognition of touched keys on mobile devices." Proceedings of the 2014 ACM SIGSAC Conference on Computer and Communications Security. ACM, (2014): 1403-1414.*

Schweitzer et al., Visualizing Keyboard Pattern Passwords, 6th International Workshop on Visualization for Cyber Sercurity Oct. 11, 2009, 978-1-4244-5415-0/09, copyright 2009, IEEE, pp. 69-73.

* cited by examiner

VERIFICATION OF A PATTERN BASED PASSCODE

TECHNICAL FIELD

The present invention relates to passcodes, and more specifically, to verification of a pattern based passcode.

BACKGROUND

Passcodes are a series of characters that are entered by a user to provide a form of authentication of a user. Passcodes may be used in a wide range of situations to protect websites, applications, remote services, financial services, etc. Passcodes are often referred to as passwords, however the term passcode is used herein to make it clear that the passcode may be formed of or include numbers and other characters as well as letters. The term passcode therefore includes personal identification numbers (PINs).

A passcode is a knowledge factor of authentication as it is something the user knows. Two-factor authentication is often used which requires something a user has and something a user knows. For example, a user may have a bankcard and may know a PIN.

BRIEF SUMMARY

An embodiment of the present invention provides a method for verification of a pattern, which includes the following steps. One or more processors of a computer system receive a user input of a series of key inputs. The one or more processors retrieve a registered pattern for the user of a sequence of keyboard direction movements. The one or more processors identify a first character input in the series of key inputs. The one or more processors determine that the identified first character is not in an excluded group of characters, where the excluded group of characters are previously used first characters in a defined period or number of instances for the user. In response to having determined that the first character is not in the excluded group of characters, the one or more processors compare the series of key inputs after the first character input with the registered pattern for the user.

The present invention also provides a computer system and computer program product that implements the preceding method for verification of a pattern.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

DETAILED DESCRIPTION

Passcodes are vulnerable to interception and fraudulent use. Passcodes may be hacked if they are seen by another party when being entered, or if they are written on a piece of paper. Hacking of passcodes also occurs by trying multiple passcodes using predefined series of common words.

One-time passwords (OTP) have been development to provide a higher level of security and to overcome the risk of a passcode being compromised. An OTP is a password that is valid for only one login session or transaction. For example, the OTP may be generated by a small device with an OTP calculator in it or this may be sent to a user out of band. A potential fraudster who intercepts an OTP cannot use it in a subsequent session or transaction.

However, it is not always convenient for a user to carry an OTP device or to receive an OTP out of band when doing a transaction.

Therefore, there is a to address the aforementioned problems of the prior art.

A passcode may take the form of a password that is made up of letters, a number which is made up of digits, or a combination of the two. The term passcode is used broadly to define any set of characters that may be input into a device using a keyboard or number pad input interface.

A user may conventionally receive or know passcode characters that are then entered into a user interface such as a keyboard, number pad, etc.

In embodiments of the described method and system, a passcode is entered into a user interface by a user by communication of a pattern of input. The pattern of input may be communicated as a sequence of relative movements subsequent to the first character.

A pattern of input may be interpreted and extracted by the direction and distance of movement between key inputs. A direction may be from one key towards an adjacent key and the direction between the keys may be given a notation for recording the pattern. A distance may be a distance moved in the direction which may be measured by movement in a single direction by one or more keys. An additional notation may be provided to indicate the distance in combination with the direction. For example, a notation may take the form 2NW indicating a movement of two keys in the direction of north west from the current key as described further below.

A user may enter the passcode into a user interface and the input may be forwarded to a server which holds or has access to registration information for the user. The user interface may be provided at a merchant premises such as a point of sale machine, at an automated teller machine, at a user's personal computer, tablet or mobile device, or any other form of user interface at which a passcode verification may be made.

The user may be registered with a service and a server may hold or have access to the registration information. The server may interpret the sequence of inputs made by the user and may extract a pattern from the inputs which is compared to a registered pattern for the user.

Figure 1:
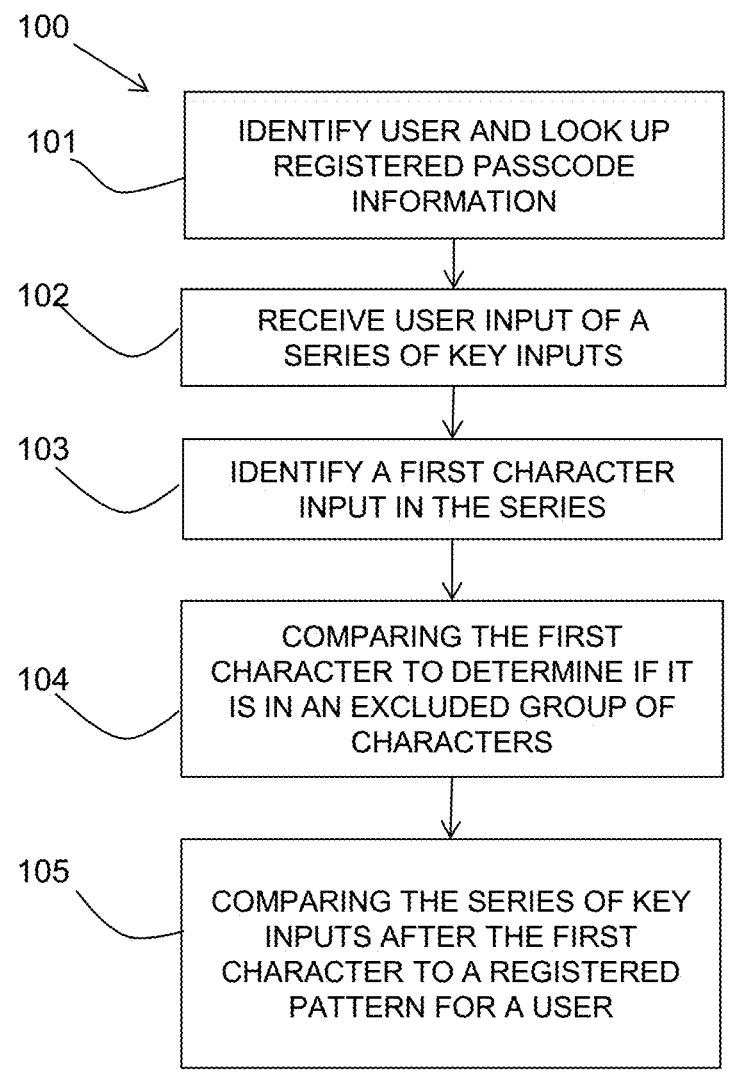
FIG. 1 is a flow diagram of an example embodiment of a method in accordance with the present invention.

Referring to FIG. 1, a flow diagram 100 shows an example embodiment of the described method as carried out at a server as a backend passcode verification system. A user may be identified (step 101) at a server, for example, by inputting a user name or providing a payment card, etc. Registered information for the identified user is retrieved, for example, from a database at or accessible by the server. The registered information may include a registered pattern for the user of a sequence of keyboard direction movements.

A series of key inputs is received (step 102) at the server as input by the user into a user interface. A first character input in the series of key inputs is identified (step 103). The first character may be compared (step 104) to an excluded group of characters and if the first character is in the excluded group the authentication may be declined. The excluded group of characters may be the previously used first characters of a last number of authentications of the user.

The backend passcode verification system may confirm that the first character is not in a rotating blacklist. Check first character is not in the n (default, n=10) last first characters entered. The backend system may maintain a list of n previously used characters, where n may be a defined number of characters, for example, typically n would be between 3 and 10 characters.

The method at the server may then compare (step 105) the series of key inputs after the first character input with the registered pattern for the user.

The registered pattern may be a sequence of keyboard direction movements. The keyboard direction movements may be a movement from a first key input to a next key input. The movement may be in a direction between the keys and may have a distance of one or more keys.

In one embodiment, the movements may be from the first character input to each of the series of input keys. In another embodiment, the movements may be between each of the keys in the series of input keys. Further details of these embodiments are given below.

In one embodiment, the server applies the registered pattern starting from the identified first character to obtain an expected series of key inputs and compares the expected series of key inputs to the received series of key inputs. The backend passcode verification system may confirm that an entered pattern is correct.

In another embodiment, the server may generate a pattern defining an extracted sequence of keyboard direction movements as extracted from the series of inputs. The pattern may be generated using a notation for the pattern, for example, based on the direction and distance of each movement. The pattern may be compared to the registered pattern for the user which may use the same notation. The backend passcode verification system may confirm that an entered pattern is correct.

The backend passcode verification system may also check for illegal moves. In the case of a hexagonal keyboard arrangement, only six directions are allowed and a no move.

Figure 2:
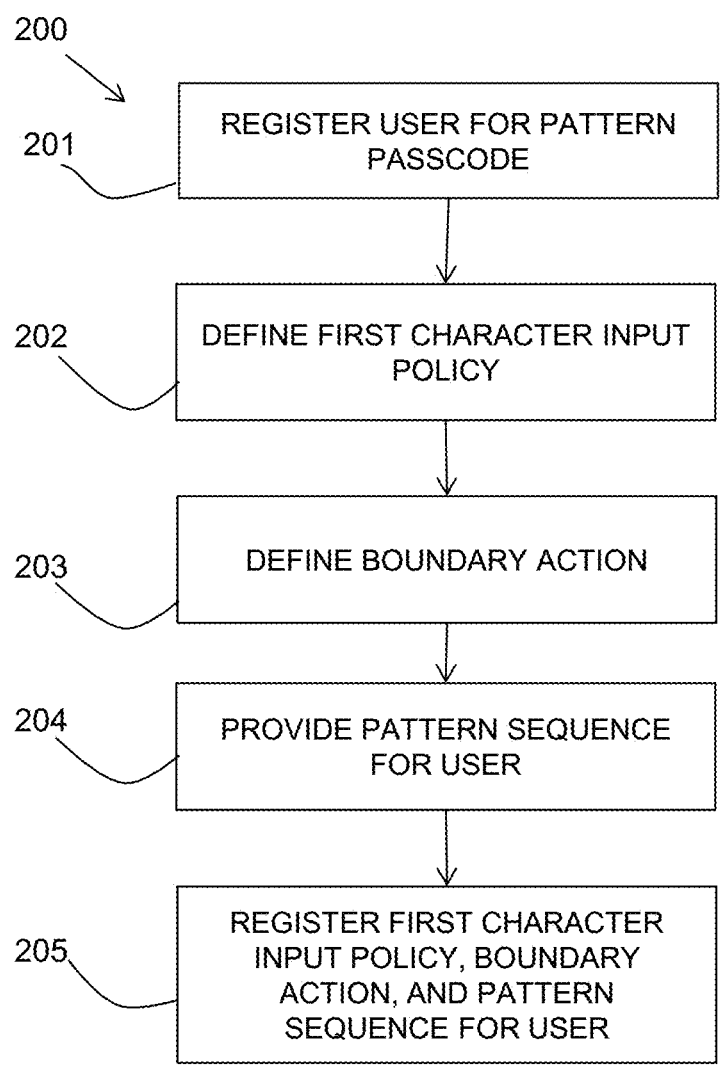
FIG. 2 is a flow diagram of an example embodiment of an aspect of a method in accordance with the present invention.

Referring to FIG. 2, a flow diagram 200 shows an example embodiment of a method of registration of a user with a service provided at a server. A user is registered (step 201) for a pattern passcode and the registration may be linked to a user name of the user or payment card which will be provided in combination with the passcode.

A first character input policy may be defined (step 202) in the form of a number of first characters that are stored by the server and blacklisted.

A boundary action may also be defined (step 203) to indicate to the user how to handle keyboard inputs where the pattern goes beyond the keyboard boundary. There may be various possible boundary actions some examples of which are described further below.

A pattern sequence may then be provided (step 204) to the user. The pattern sequence may be provided in various different ways but must be provided securely to the user. The pattern sequence may be provided using an agreed notation.

The server may register (step 205) the first character input policy, the boundary action to be used, and the pattern sequence in a database for the user such that the boundary action may be retrieved when a user provides the passcode pattern for authentication of a transaction or session.

The keys on a conventional "QWERTY", "AZERTY", or other language keyboards are arranged generally hexagonally. From a key that is surrounded by other keys, there are six directions of movement which are possible. Where keys are on the edge or corner of the keyboard, there are less options for direction of movement.

Other non-hexagonal keyboard layouts may use a grid or square arrangement of keys in which case there will be eight directions of movement from a starting key (N, S, E, W, NE, NW, SE, SW). The described method and system is equally applicable to different keyboard layouts.

A number keypad for entry of numerical digits is usually laid out as a grid of the number keys in which case there are eight directions of movement from the central key but any keys on the corners or edges of the keypad will have more limited directions of movement.

Equivalent methods may be used with keyboards for languages with other characters.

Figure 3A:
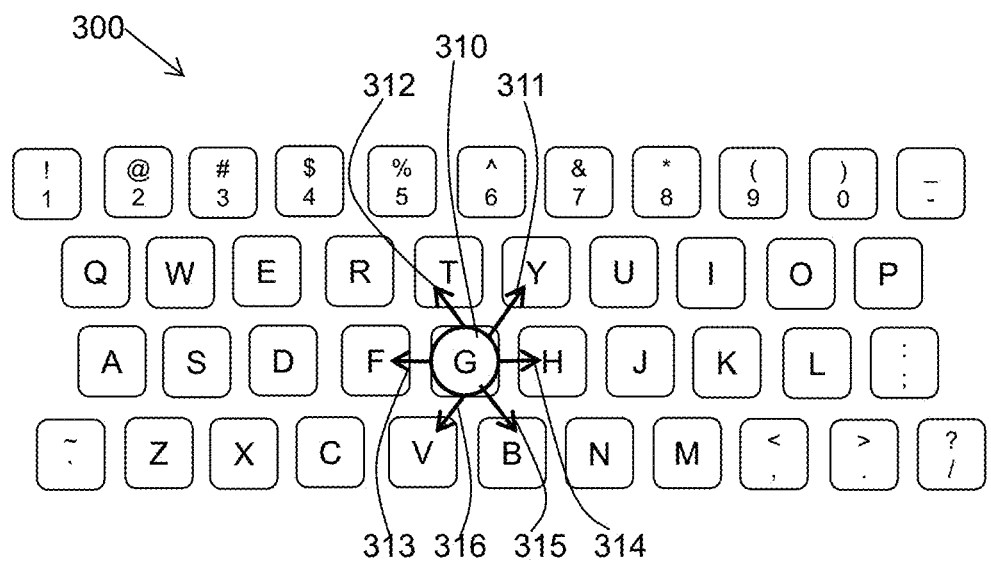
FIGS. 3A and 3B are schematic diagrams showing two embodiments of keyboards as used in accordance with the present invention.

Referring to FIG. 3A, an example embodiment is shown using a QWERTY keyboard 300 in which the keys are arranged generally hexagonally.

A selected key 310 may have six possible directions of movement from it which may be defined as follows:
North West (NE) 311;
North East (NW) 312;
West (W) 313;
East (E) 314;
South East (SE) 315; and
South West (SW) 316.

One movement may be defined as a direction and the length or distance to be moved in that direction. For example, 2NE is a notation used to mean go two steps or keys in the NE direction. A length 0 may be used to mean that no movement is made in that step.

A passcode pattern may therefore be a sequence of movements. For example, 2NE1SW3E4NW is the sequence of 2NE, 1SW, 3E, 4NW. The pattern itself is the passcode and not the entered keyboard characters. Many other forms of notation may be used to define the pattern.

Figure 3B:
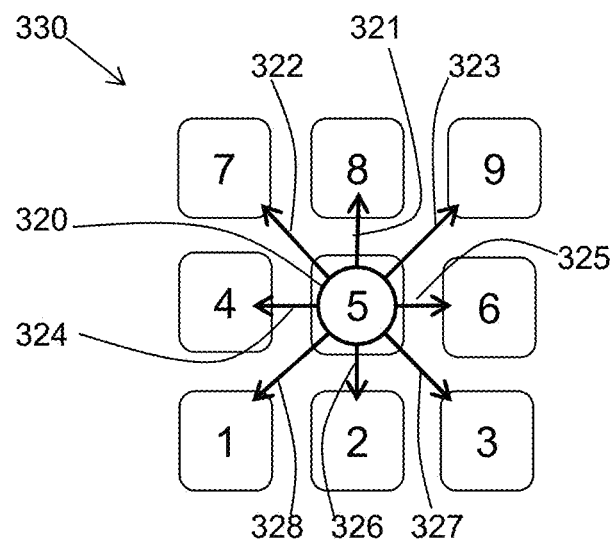

Referring to FIG. 3B, a numerical keypad 330 is shown which has a grid arrangement.

A selected key 320 may have eight possible directions of movement from it which may be defined as follows:
North (N) 321;
North West (NW) 322;
North East (NE) 323;
West (W) 324;
East (E) 325;
South (S) 326;
South East (SE) 327;
South West (SW) 328.

With a keypad 330 which has limited keys, the movements may be limited to a single movement in each direction.

A given movement may go beyond the boundary of a keyboard. There are various methods of handling this including but not limited to: wrapping to the other side of a keyboard, bouncing to return in the opposite direction, or constraining the movement. The backend verification system and the user must use the same boundary action.

Figure 4A:
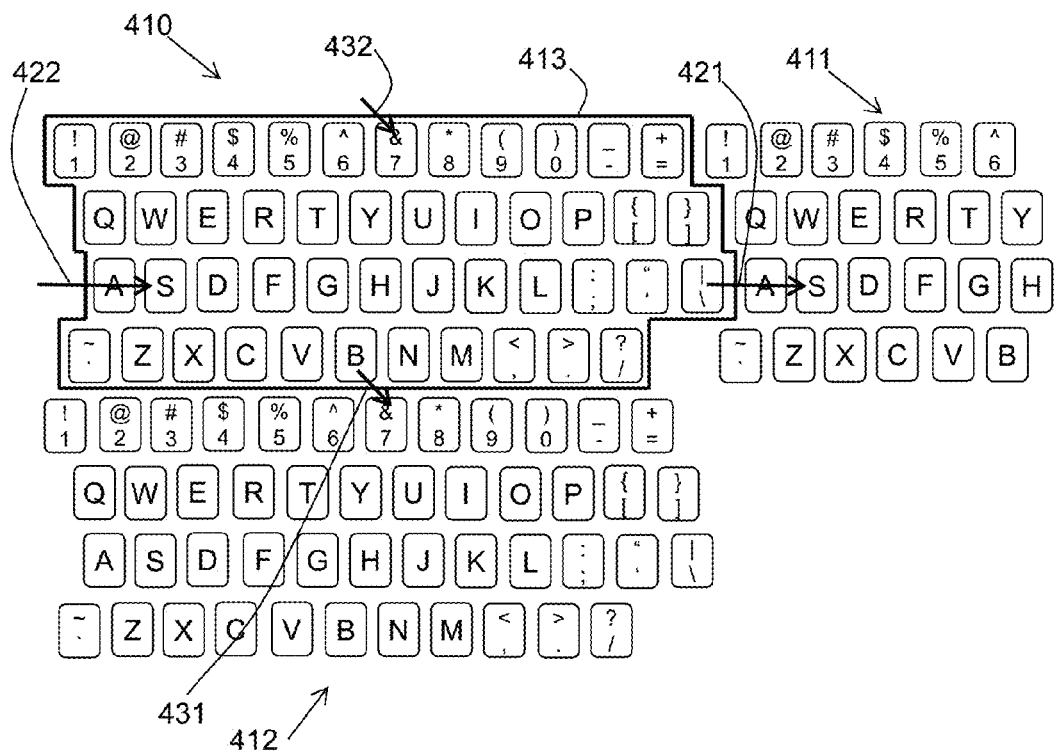
FIGS. 4A to 4C are schematic diagrams showing three embodiments of boundary actions in accordance with the present invention.
Figure 4B:
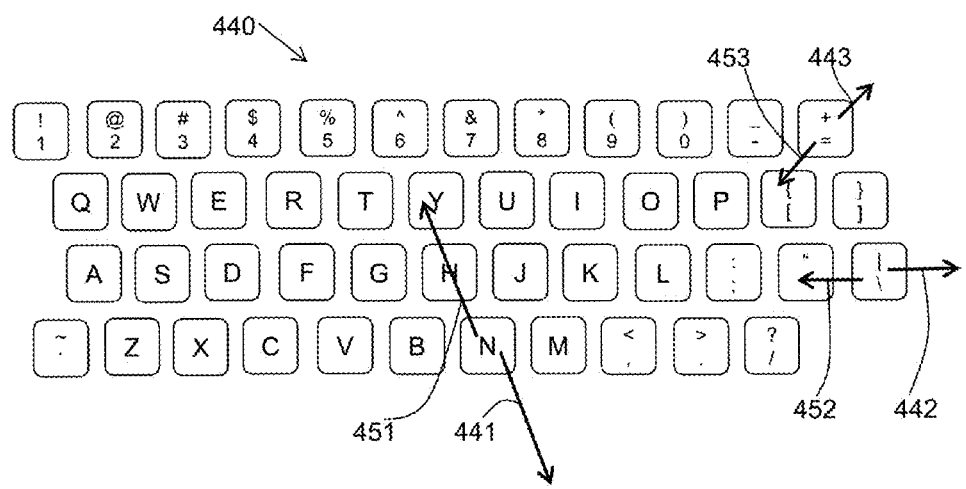
Figure 4C:
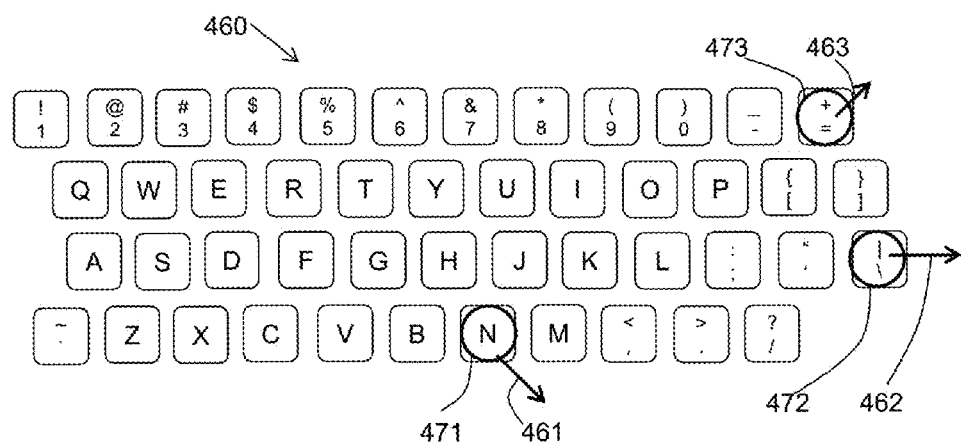

Referring to FIGS. 4A to 4C, three example embodiment of boundary actions are shown which may be specified for use by the user when entering a passcode pattern.

FIG. 4A, shows a diagram of a keyboard 410 illustrating a boundary action in the form of a wrapping action. A keyboard 410 is shown with imagined repeats 411, 412 to the right and below the keyboard 410. Additionally, such repeats may be imagined above and to the left of the keyboard 410.

In a wrapping action, if a movement 421, 431 goes outside the boundary 413 of the keyboard 410 it is wrapped to re-enter 422, 432 the keyboard 410 on the opposing side. It re-enters the keyboard 410 to point to the same key it would have pointed to in the imagined adjacent keyboard repeats 411, 412.

For example, arrow 421 shows a movement in the 2E direction—two keys to the right. This takes the movement from the last key on the right side boundary of the keyboard 410 to the "S" key in the imagined keyboard 411. The arrow 421 is handled by wrapping 422 to the left side boundary of the keyboard 410 where it re-enters the keyboard 410 and points to the "S" key in the real keyboard 410.

Another example arrow 431 shows a movement in the 1SE direction—one key diagonally down to the right. This takes the movement from the bottom row of keys of the keyboard 410 to the "7" key in the imagined keyboard 412. The arrow 431 is handled by wrapping 432 to the top boundary of the keyboard 410 where it re-enters the keyboard 410 and points to the "7" key in the real keyboard 410.

FIG. 4B, shows a diagram of a keyboard 440 illustrating a boundary action in the form of a bounce action.

In a bounce action, if a movement 441, 442, 443 goes beyond the boundary of the keyboard 440, the movement 441, 442, 443 is bounced and reflected back 451, 452, 453 into the keyboard. The reflected movement 451, 452, 453 is the same distance as the movement was meant to go outside the keyboard 440.

FIG. 4C, shows a diagram of a keyboard 460 illustrating a boundary action in the form of a restraint action.

In a constraint action, if a movement 461, 462, 463 goes beyond the boundary of the keyboard 460, the movement 461, 462, 463 is constrained to stay 471, 472, 473 at the boundary key until another pattern sequence is entered.

Figure 5A:
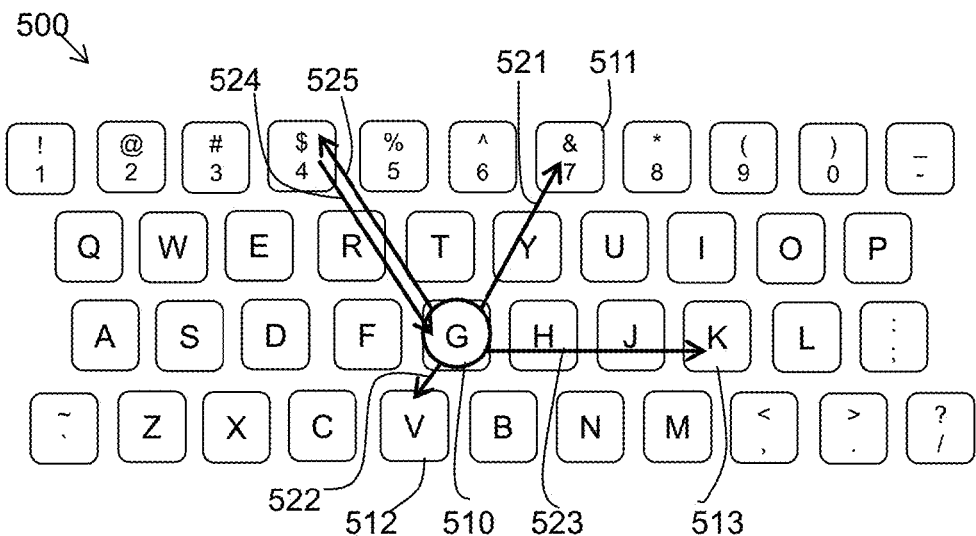
FIGS. 5A and 5B are schematic diagrams showing two embodiments of a series of inputs in accordance with the present invention.
Figure 5B:
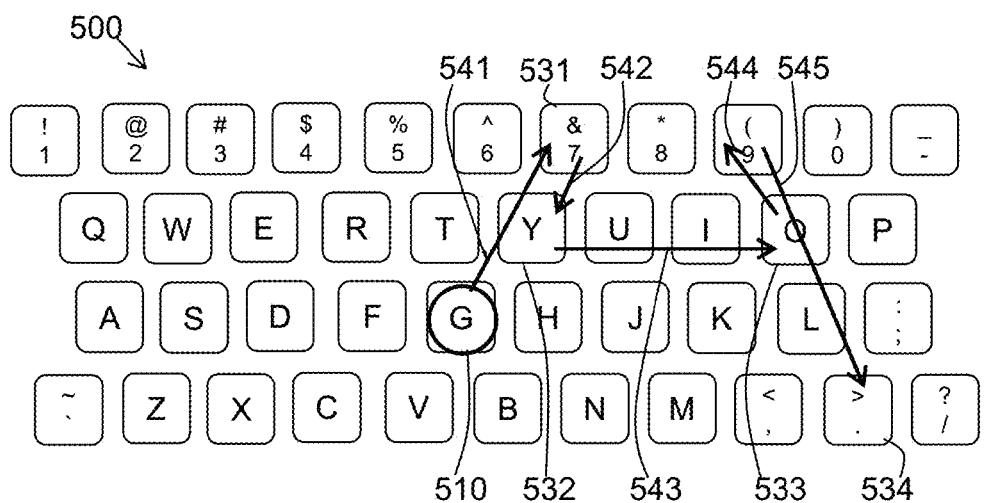

Referring to FIGS. 5A and 5B, two embodiments are illustrated showing a user input of a series of inputs in accordance with a pattern passcode as described. In these two embodiments, they both use a boundary action of a bounce action. In FIG. 5A, all movements are made from the first character input key. In FIG. 5B, the movements are made in a sequence moving on from the last key input.

FIGS. 5A and 5B, show a keyboard 500 in which a user inputs a first character 510 of the letter "G". The first character 510 may be input by the user based on a first key policy as defined by the server such that the first character 510 does not fall in an excluded list.

A user has a passcode pattern of the form "2NE1SW3E4NW".

In FIG. 5A in which each movement is made from the starting key, this results in the following movements:

a first movement 521 a distance of two keys to the North East from starting key "G" 510, landing on key "7" 511;

a second movement 522 a distance of one key to the South West from starting key "G" 510, landing on key "V" 512;

a third movement 523 a distance of three keys to the East from starting key "G" 510, landing on key "K" 513; and a fourth movement 524 a distance of four keys to the North West from starting key "G" 510, which bounces 525 at the boundary after a movement of two keys and moves two further keys in the bounce direction and lands on key "G" 510.

This results in an entered series of inputs of "G7VKG". The backend verification server may apply the known passcode pattern "2NE1SW3E4NW" registered for the user to the starting first character of "G" using this restart method returning to the first character for each movement and with a bounce action and will thereby verify that the series of inputs is correct. The server checks the expected characters from the first character input plus the known pattern.

In FIG. 5B in which the movements are made moving on from the last input key, this results in the following movements:

a first movement 541 a distance of two keys to the North East from starting key "G" 510, landing on key "7" 531;

a second movement 542 a distance of one key to the South West from last key "7' 531, landing on key "Y" 532;

a third movement 543 a distance of three keys to the East from last key "Y" 532, landing on key "0" 533; and a fourth movement 544 a distance of four keys to the North West from last key "0" 533, which bounces 545 at the boundary after a movement of one key and moves three further keys in the bounce direction and lands on key ">" 534.

This results in an entered series of inputs of "G7Y0>". The backend verification server may apply the known passcode pattern "2NE1SW3E4NW" registered for the user to the starting first character of "G" using this continuous method and with a bounce action and will thereby verify that the series of inputs is correct.

The described method has the advantage that someone intercepting the passcode cannot use it for the next n times the user enters the passcode as they will not know the starting character. The OTP modulo is the length of the black list (typically approximately 10); however, a much longer blacklisting may be provided.

Another advantage is that no challenge is required and the input is similar to regular passcodes and almost the same checking protocol.

The described method is hard to intercept as a hacker needs to know all of the pattern, the blacklist and its length, and the boundary protocol.

Figure 6:
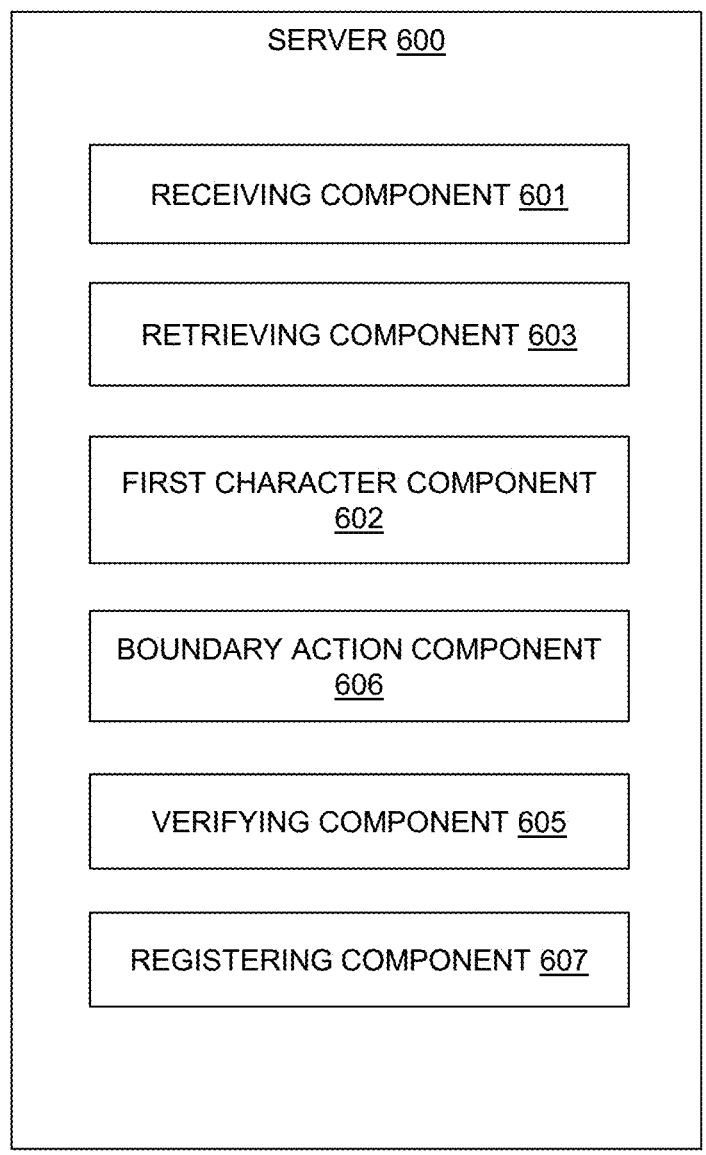
FIG. 6 is block diagram of an example embodiment of a system in accordance with the present invention.

Referring to FIG. 6, a block diagram shows a server 600 of a backend verification system.

The server 600 may include a receiving component 601 for receiving a user input in the form of a series of key inputs.

The server 600 may include a retrieving component 603 for retrieving a registered pattern for the user of a sequence of keyboard direction movements.

The server 600 may include a first character component 602 for identifying a first character input in the series of key inputs and for determining if the identified first character is in an excluded group of characters. The excluded group of characters may be previously used first characters in a defined period or number of instances for the user.

A boundary action component 606 may be provided for determining an agreed boundary action for the user and applying the agreed boundary action when comparing the series of key inputs after the first character input with the registered pattern for the user.

A verifying component 605 of the server 600 may compare the series of key inputs after the first character input with the registered pattern for the user.

The server 600 may include a registering component 607 for registering a user to use a passcode pattern including registering a first character policy, registering a bounding action policy, and registering a passcode pattern in association with the user. The registered information for a user may be stored in a database accessible to the server 600.

Figure 7:
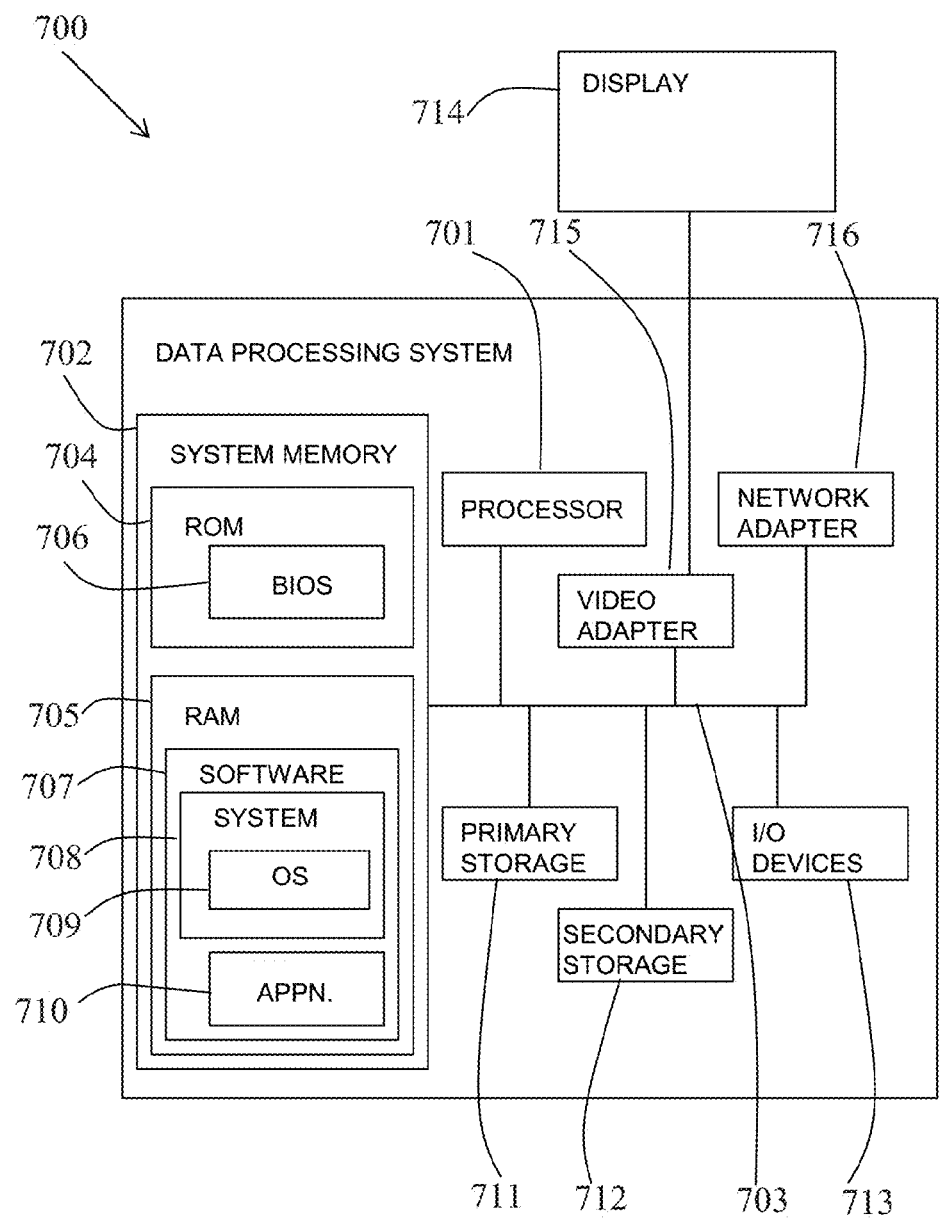
FIG. 7 is a block diagram of an embodiment of a computer system in which the present invention may be implemented.

Referring to FIG. 7, an exemplary system for implementing aspects of the invention includes a data processing system 700 suitable for storing and/or executing program code including at least one processor 701 coupled directly or indirectly to one or more respective memory elements through a bus system 703. The memory elements may include local memory employed during actual execution of the program code, bulk storage, and cache memories which provide temporary storage of at least some program code in order to reduce the number of times code must be retrieved from bulk storage during execution.

The memory elements may include system memory 702 in the form of read only memory (ROM) 704 and random access memory (RAM) 705. A basic input/output system (BIOS) 706 may be stored in ROM 704. Software 707 may be stored in RAM 705 including system software 708 such as operating system software 709. Software applications 710 may also be stored in RAM 705.

The system 700 may also include one or more storage devices (e.g., a primary storage devices 711 such as a magnetic hard disk drive and secondary storage device 712 such as a magnetic disc drive and an optical disc drive). The drives and their associated computer-readable media provide non-volatile storage of computer-executable instructions, data structures, program modules and other data for the system 700. Software applications may be stored on the primary and secondary storage means 711, 712 as well as the system memory 702.

The computing system 700 may operate in a networked environment using logical connections to one or more remote computers via a network adapter 716.

Input/output devices 713 may be coupled to the system either directly or through intervening I/O controllers. A user may enter commands and information into the system 700 through input devices such as a keyboard, pointing device, or other input devices (for example, microphone, joy stick, game pad, satellite dish, scanner, or the like). Output devices may include speakers, printers, etc. A display device 714 is also connected to system bus 703 via an interface, such as video adapter 715.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable storage devices storing computer readable program code, said program code containing instructions executable by one or more processors of a computer system to implement the methods of the present invention.

A computer system of the present invention comprises one or more processors, one or more memories, and one or more computer readable storage devices, said storage devices containing program code executable by the one or more processor via the one or more memories to implement the methods of the present invention.

Improvements and modifications can be made to the foregoing without departing from the scope of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for verification of a pattern based passcode, said method comprising:

receiving, by one or more processors of a computer system from a user, a user input of a series of key inputs to a keyboard, wherein each key input to the keyboard is an input by the user of a key of the keyboard, wherein each key of the keyboard denotes a unique character, and wherein the series of key inputs includes at least three key inputs;

retrieving, by the one or more processors, a registered pattern for the user of a sequence of keyboard direction movements, wherein the pattern based passcode is the registered pattern of the sequence of keyboard direction movements;

identifying, by the one or more processors, a first character in a first key input of the series of key inputs, wherein the first key input is the first key, of the series of key inputs, that was inputted by the user;

determining, by the one or more processors, that the identified first character is not in an excluded group of characters, wherein the excluded group of characters are previously used first characters in each instance of a previous series of a plurality of different previous series of key input by the user in a specified period of time or for a specified number of said instances; and in response to having determined that the first character is not in the excluded group of characters, verifying, by the one or more processors, that a pattern of directional movements from the first character to the remaining characters after the first character in the series of key inputs matches the registered pattern for the user, wherein said verifying includes: applying the registered pattern starting from the identified first character to obtain an expected series of key inputs; comparing the expected series of key inputs to the received series of key inputs with the expected series of key inputs; and verifying, from said comparing, that the received series of key inputs matches the expected series of key inputs, wherein said applying the registered pattern comprises: applying a specified boundary action to a directional movement away from the keyboard at a boundary key of the keyboard, wherein the boundary action is a wrapping action from one side boundary of the keyboard adjacent to the boundary key to a corresponding key on an opposing side boundary of the keyboard.

2. The method of claim 1, wherein said verifying includes:

determining a sequence of keyboard direction movements from the first character to the remaining characters after the first character in the series of key inputs;

generating a pattern defining the determined sequence of keyboard direction movements;

comparing the generated pattern with the registered pattern for the user; and verifying, from said comparing, that the generated pattern matches the registered pattern.

3. The method of claim 1, wherein a sequence of keyboard direction movements, from the first character to the remaining characters after the first character in the series of key inputs, includes a direction of movement and a length of movement for each keyboard direction movement.

4. The method of claim 3, wherein the sequence of keyboard direction movements are each from the first character to a subsequent input character.

5. The method of claim 3, wherein the sequence of keyboard direction movements are each from an immediately previous input character to a next input character.

6. The method of claim 1, wherein the excluded group of characters are previously used first characters in instances of previous series of key inputs in the specified period of time.

7. The method of claim 1, wherein the excluded group of characters are previously used first characters in instances of previous series of key inputs for the specified number of said instances.

8. A computer program product, comprising:
one or more computer readable storage devices storing computer readable program code, said program code containing instructions executable by one or more processors of a computer system to implement a method for verification of a pattern based passcode, said method comprising:
receiving, by the one or more processors from a user, a user input of a series of key inputs to a keyboard, wherein each key input to the keyboard is an input by the user of a key of the keyboard, wherein each key of the keyboard denotes a unique character, and wherein the series of key inputs includes at least three key inputs;
retrieving, by the one or more processors, a registered pattern for the user of a sequence of keyboard direction movements, wherein the pattern based passcode is the registered pattern of the sequence of keyboard direction movements;
identifying, by the one or more processors, a first character in a first key input of the series of key inputs, wherein the first key input is the first key, of the series of key inputs, that was inputted by the user;
determining, by the one or more processors, that the identified first character is not in an excluded group of characters, wherein the excluded group of characters are previously used first characters in each instance of a previous series of a plurality of different previous series of key input by the user in a specified period of time or for a specified number of said instances; and
in response to having determined that the first character is not in the excluded group of characters, verifying, by the one or more processors, that a pattern of directional movements from the first character to the remaining characters after the first character in the series of key inputs matches the registered pattern for the user,
wherein said verifying includes: applying the registered pattern starting from the identified first character to obtain an expected series of key inputs; comparing the expected series of key inputs to the received series of key inputs with the expected series of key inputs; and verifying, from said comparing, that the received series of key inputs matches the expected series of key inputs,
wherein said applying the registered pattern comprises: applying a specified boundary action to a directional movement away from the keyboard at a boundary key of the keyboard,
wherein the boundary action is a wrapping action from one side boundary of the keyboard adjacent to the boundary key to a corresponding key on an opposing side boundary of the keyboard.

9. The computer program product of claim 8, wherein said verifying includes:
determining a sequence of keyboard direction movements from the first character to the remaining characters after the first character in the series of key inputs;
generating a pattern defining the determined sequence of keyboard direction movements;
comparing the generated pattern with the registered pattern for the user; and verifying, from said comparing, that the generated pattern matches the registered pattern.

10. The computer program product of claim 8, wherein a sequence of keyboard direction movements, from the first character to the remaining characters after the first character in the series of key inputs, includes a direction of movement and a length of movement for each keyboard direction movement.

11. A computer system, comprising:
one or more processors,
one or more memories, and
one or more computer readable storage devices, said storage devices containing program code executable by the one or more processor via the one or more memories to verify a pattern based passcode, said program code comprising:
program code for receiving, from a user, a user input of a series of key inputs to a keyboard, wherein each key input to the keyboard is an input by the user of a key of the keyboard, wherein each key of the keyboard denotes a unique character, and wherein the series of key inputs includes at least three key inputs;
program code for retrieving a registered pattern for the user of a sequence of keyboard direction movements, wherein the pattern based passcode is the registered pattern of the sequence of keyboard direction movements;
program code for identifying a first character in a first key input of the series of key inputs, wherein the first key input is the first key, of the series of key inputs, that was inputted by the user;
program code for determining that the identified first character is not in an excluded group of characters, wherein the excluded group of characters are previously used first characters in each instance of a previous series of a plurality of different previous series of key input by the user in a specified period of time or for a specified number of said instances; and
program code for, in response to having determined that the first character is not in the excluded group of characters, verifying that a pattern of directional movements from the first character to the remaining characters after the first character in the series of key inputs matches the registered pattern for the user,
wherein said program code for verifying includes: program code for applying the registered pattern starting from the identified first character to obtain an expected series of key inputs; program code for comparing the expected series of key inputs to the received series of key inputs with the expected series of key inputs; and program code for confirming, from said comparing, that the received series of key inputs matches the expected series of key inputs,
wherein said program code for applying the registered pattern comprises: program code for applying a specified boundary action to a directional movement away from the keyboard at a boundary key of the keyboard, wherein the boundary action is a wrapping action from one side boundary of the keyboard adjacent to the boundary key to a corresponding key on an opposing side boundary of the keyboard.

12. The computer system of claim 11, wherein said program code for verifying includes:
- program code for determining a sequence of keyboard direction movements from the first character to the remaining characters after the first character in the series of key inputs;
- program code for generating a pattern defining the determined sequence of keyboard direction movements;
- program code for comparing the generated pattern with the registered pattern for the user; and
- program code for confirming, from said comparing, that the generated pattern matches the registered pattern.

\* \* \* \* \*